(12) United States Patent
Doerr (10) Patent No.: US 9,188,741 B2
(45) Date of Patent: Nov. 17, 2015

(54) ADJUSTABLE MULTIPLE-CHANNEL OPTICAL SWITCH

(75) Inventor: Christopher Richard Doerr, Middletown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 923 days.

(21) Appl. No.: 13/174,029

(22) Filed: Jun. 30, 2011

(65) Prior Publication Data

US 2012/0230690 A1 Sep. 13, 2012

Related U.S. Application Data

(60) Provisional application No. 61/451,175, filed on Mar. 10, 2011.

(51) Int. Cl.

| H04J 14/00 | (2006.01) |
|---|---|
| G02B 6/12 | (2006.01) |
| G02B 6/293 | (2006.01) |
| H04Q 11/00 | (2006.01) |
| H04J 14/02 | (2006.01) |
| H04J 14/06 | (2006.01) |

(52) U.S. Cl.
CPC .......... *G02B 6/12033* (2013.01); *G02B 6/2938* (2013.01); *G02B 6/29395* (2013.01); *H04J 14/0212* (2013.01); *H04J 14/0213* (2013.01); *H04J 14/06* (2013.01); *H04Q 11/0005* (2013.01); *H04Q 2011/0016* (2013.01); *H04Q 2011/0032* (2013.01)

(58) Field of Classification Search
CPC .................................................. H04J 14/0209

USPC .................................................. 398/45, 48, 79
See application file for complete search history.

(56) References Cited

U.S. PATENT DOCUMENTS

| 2003/0133641 | A1* | 7/2003 | Yoo ................................. 385/14 |
|---|---|---|---|
| 2006/0098981 | A1 | 5/2006 | Miura et al. |
| 2009/0154923 | A1 | 6/2009 | Kwon et al. |
| 2009/0297149 | A1 | 12/2009 | Nakazato et al. |

OTHER PUBLICATIONS

Patent Abstracts of Japan, Publication No. 2009-134192, published Jun. 18, 2009, 2 pgs.
Japanese Laid-Open Patent Application Publication 2009-134192, Jun. 18, 2009, pp. 1-20.
PCT International Search Report, PCT/US2012/025356, International Filing Date Feb. 16, 2012, Date of Mailing Sep. 24, 2012, 3 pgs.

(Continued)

*Primary Examiner* — Danny Leung
(74) *Attorney, Agent, or Firm* — Gang Chen; John F. McCabe (57) ABSTRACT

An apparatus includes a wavelength-selective switch having an optical demultiplexer having N optical outputs, a first optical multiplexer having N optical inputs, a second optical multiplexer having N optical inputs, and a plurality of controllable 1×P optical switches. Integer P is greater than or equal to 2. Each of the optical switches is connected to a corresponding one of the optical outputs of the optical demultiplexer and is connected to corresponding ones of the optical inputs of the respective first and second optical multiplexers. The optical AWG demultiplexer has an optical AWG sampling coefficient of one or more for light with a wavelength in the optical telecommunication C-band, L-band, or S-band.

13 Claims, 5 Drawing Sheets

(56) References Cited

OTHER PUBLICATIONS

T. A. Strasser et al., "Wavelength-Selective Switches for ROADM Applications", IEEE J. Selected Topics in Quantum Electronics, vol. 16, No. 5, Sep./Oct. 2010, pp. 1150-1157.

G. Baxter, et al., "Highly programmable Wavelength Selective Switch based on Liquid Crystal on Silicon switching elements", OFC, paper OtuF2.pdf, 2006, 3 pages.

J. E. Ford, et al., "Wavelength Add-Drop Switching Using Tilting Micromirrors", J. Lightwave Tech., vol. 17, No. 5, May 1999, pp. 904-911.

K. Okamoto, et al., "16-channel optical add/drop multiplexer consisting of arrayed-waveguide gratings and double-gate switches", Electronics Letters, vol. 32, No. 16, Aug. 1996, pp. 1471-1472.

C. R. Doerr, et al., Wavelength-Division Multiplexing Cross Connect in InP, IEEE Photonics Technology Letters, vol. 10, No. 1, Jan. 1998, pp. 117-119.

T. Ducellier, et al., "Novel High Performance Hybrid Waveguide—MEMS 1×9 Wavelength Selective Switch in a 32-Cascade Loop Experiment", ECOC 2004 Proceedings, Paper Th4.2.2, 2004, 2 pages.

C. R. Doerr, et al., "Dynamic Wavelength Equalizer in Silica Using the Single-Filtered-Arm Interferometer", IEEE Photonics Technology Letters, vol. 11, No. 5, May 1999, pp. 581-583.

C. R. Doerr, et al., "Wide Bandwidth Silicon Nitride Grating Coupler", IEEE Photonics Technology Letters, vol. 22, No. 19, Oct. 2010, pp. 1461-1463.

D. Taillert, et al., "A Compact Two-Dimensional Grating Coupler Used as a Polarization Splitter", IEEE Photonics Technology Letters, vol. 15, No. 9, Sep. 2003, pp. 1249-1251.

W. Bogaerts, et al., "Low-loss, low-cross-talk crossings for silicon-on-insulator nanophotonic waveguides", Optics Letters., vol. 32, No. 19, Oct. 2007, pp. 2801-2803.

C. R. Doerr, et al., "Monolithic Gridless 1×2 Wavelength-Selective Switch in Silicon", Post deadline paper at OFC 2011, publicly disclosed on Mar. 10, 2011, 3 pages.

Japanese Laid-Open Patent Application Publication No. 2009-134192, Jun. 18, 2009, pp. 1-20.

Japanese Patent Application Publication No. 2009-134192, Publication Date Jun. 18, 2009, English translation, pp. 1-40.

\* cited by examiner

```
┌─────────────────────────────────────────────────┐
│  DEMULTIPLEX A RECEIVED DATA-MODULATED OPTICAL SIGNAL │
│  INTO A SET OF DISJOINT WAVELENGTH SAMPLES WITH AN AWG │
│  OPTICAL DEMULTIPLEXER, WHEREIN AN INDIVIDUAL WAVELENGTH │
│  SAMPLE INCLUDES A PORTION OF AN INDIVIDUAL ONE OF THE │
│    WAVELENGTH CHANNELS IN THE RECEIVED OPTICAL SIGNAL │
└─────────────────────────────────────────────────┘
                         │
                         42
┌─────────────────────────────────────────────────┐
│   ROUTE THE LIGHT OF EACH INDIVIDUAL SET TO A SELECTED │
│    ONE OF TWO AWG OPTICAL MULTIPLEXERS, WHEREIN THE │
│       ROUTING USES A SEPERATE CONTROLLABLE 1XP OPTICAL │
│    SWITCH TO ROUTE THE LIGHT OF EACH WAVELENGTH SAMPLE │
└─────────────────────────────────────────────────┘
                         │
                         44
┌─────────────────────────────────────────────────┐
│   REROUTE THE PART OF THE OPTICAL SIGNAL OF AT LEAST, │
│   ONE OF THE SETS TO A DIFFERENT SELECTED ONE OF THE │
│    1XP AWG OPTICAL MULTIPLEXERS, WHEREIN THE REROUTING │
│    USES A SEPARATE ONE OF THE CONTROLLABLE 1XP OPTICAL │
│    SWITCHES TO ROUTE THE LIGHT OF EACH WAVELENGTH SAMPLE │
└─────────────────────────────────────────────────┘
                         │
                         46

# ADJUSTABLE MULTIPLE-CHANNEL OPTICAL SWITCH

This application claims the benefit of U.S. provisional application 61/451,175, filed on Mar. 10, 2011.

BACKGROUND

1. Technical Field

The inventions relate to optical switches, methods of making optical switches and/or methods of using optical switches.

2. Discussion of the Related Art

This section introduces aspects that may be helpful to facilitating a better understanding of the inventions. Accordingly, the statements of this section are to be read in this light and are not to be understood as admissions about what is in the prior art or what is not in the prior art.

Herein, a 1×K optical wavelength-selective switch (OWSS) is a 1×K optical switch that can independently route individual wavelength channels between the optical input and the K optical outputs of the optical switch. OWSSes are fundamental building blocks that may be used in reconfigurable optical add/drop multiplexers and optical cross-connects.

Some OWSSes use liquid-crystal-on silicon (LCOS) or micro-electromechanical (MEMS) spatial light modulators as free-space optical technologies. Some such OWSSes may be gridless. Herein, an optical device, e.g., an OWSS, is a gridless optical device if the device has an adjustable wavelength-channel spacing and an adjustable bandwidth that enables use of the device in optical systems with different wavelength-channel spacings and wavelength channel bandwidths. One example of a gridless optical device is an optical device that is useable in wavelength division multiplexed (WDM) systems in which the center-to-center spacing of optical channels is 100 giga-hertz or 50 giga-hertz.

BRIEF SUMMARY

OWSSes using free-space technology may have some disadvantages. For example, such free-space OWSSes often require large, complex and expensive assemblies, e.g., often using hermetic packaging. Herein, some of the embodiments provide integrated OWSSes. Some such embodiments of OWSSes may further be operated as gridless optical devices.

An apparatus includes a wavelength-selective switch having an optical AWG demultiplexer having N optical outputs, a first optical AWG multiplexer having N optical inputs, a second optical AWG multiplexer having N optical inputs, and a plurality of controllable 1×P optical switches. Each of the optical switches is connected to a corresponding one of the optical outputs of the optical AWG demultiplexer and is connected to corresponding ones of the optical inputs of the respective first and second optical AWG multiplexers. P is an integer that is greater than or equal to 2.

In the above apparatus, the optical AWG demultiplexer and/or one or more of the optical AWG multiplexers may have an optical AWG sampling coefficient of one or more for light with a wavelength in the optical telecommunication C-band, L-band, or S-band.

In any above embodiments, the above apparatus may further include an integrated optical device that includes the optical AWG demultiplexer, the optical AWG multiplexers and the optical switches. In some such embodiments, the apparatus may further include an electronic controller configured to operate each optical switch to transmit received light to the first optical AWG multiplexer or alternately to transmit the received light to the second optical AWG multiplexer.

In any above embodiments, the apparatus may further include an electronic controller configured to operate the optical switches in disjoint sets such that each optical switch of one of the sets transmits light, in parallel, to the same selected one of the optical AWG demultiplexers. Each set is formed by M of the 1×P optical switches. In some such embodiments, the apparatus may further include an integrated optical device that includes the optical AWG demultiplexer, the optical AWG multiplexers and the optical switches.

In some embodiments of any of the above apparatus, the optical AWG demultiplexer may have an optical AWG sampling coefficient of 1 or higher for light having a wavelength in the optical telecommunication C-band or L-band.

In some embodiments, any of the above apparatus may also include a polarization splitter and second wavelength-selective switch. The second wavelength-selective switch includes a second optical AWG demultiplexer having P optical outputs, a third optical AWG multiplexer having P optical inputs, a fourth optical AWG multiplexer having P optical inputs, and a second plurality of controllable 1×P optical switches. Each of the optical switches of the second plurality is connected to a corresponding one of the optical outputs of the second optical AWG demultiplexer and is connected to corresponding ones of the optical inputs of the respective third and fourth optical AWG multiplexers. The polarization splitter has first and second optical outputs connected to the first and second optical AWG demultiplexers, respectively. Some such embodiments may further include a polarization splitter having optical inputs connected to the first and third optical AWG demultiplexers. Any such embodiments may further include an integrated optical device that includes the optical AWG demultiplexers, the optical AWG multiplexers and the optical switches. Any such embodiments may further include an electronic controller configured to operate each optical switch of the first plurality to transmit received light to the first optical AWG multiplexer or alternately to transmit the received light to the second optical AWG multiplexer. The controller is also configured to operate each optical switch of the second plurality to transmit received light to the third optical AWG multiplexer or alternately to transmit the received light to the fourth optical AWG multiplexer.

In other embodiments, a method includes demultiplexing a sequence of adjacent wavelength-channels of a data-modulated optical signal into a set of disjoint wavelength samples with an optical AWG demultiplexer. Each of the wavelength samples includes a portion of one of the wavelength-channels in the optical signal. The method includes routing light of each individual set to a selected one of P optical AWG multiplexers. The act of routing uses a separate controllable 1×P optical switch to route the light of each of the wavelength samples. P is an integer greater than or equal to 2. The method includes rerouting a part of the optical signal of, at least, one of the sets to a different selected one of the P optical AWG multiplexers. The act of rerouting uses one of the controllable 1×P optical switches to reroute light of each wavelength sample of the part of the optical signal.

In some embodiments of the above method, the optical AWG demultiplexer has an optical AWG sampling coefficient of one or more for light with a wavelength in the optical telecommunication C-band, L-band, or S-band.

In some embodiments of any of the above methods, each set includes multiple disjoint ones of the wavelength samples.

In some embodiments of any of the above methods, the optical AWG demultiplexer has an optical AWG sampling coefficient of one or more for light with a wavelength in the optical telecommunication C-band, L-band, or S-band.

In some embodiments of any of the above methods, P is an integer greater than 2.

BRIEF DESCRIPTION OF THE DRAWINGS

In the Figures and text, like reference symbols indicate elements with similar or the same function and/or structure.

In the Figures, relative dimension(s) of some feature(s) may be exaggerated to more clearly illustrate the feature(s) and/or relation(s) to other feature(s) therein.

Herein, various embodiments are described more fully by the Figures and the Detailed Description of Illustrative Embodiments. Nevertheless, the inventions may be embodied in various forms and are not limited to the embodiments described in the Figures and the Detailed Description of Illustrative Embodiments.

DETAILED DESCRIPTION OF ILLUSTRATIVE EMBODIMENTS

Figure 1:
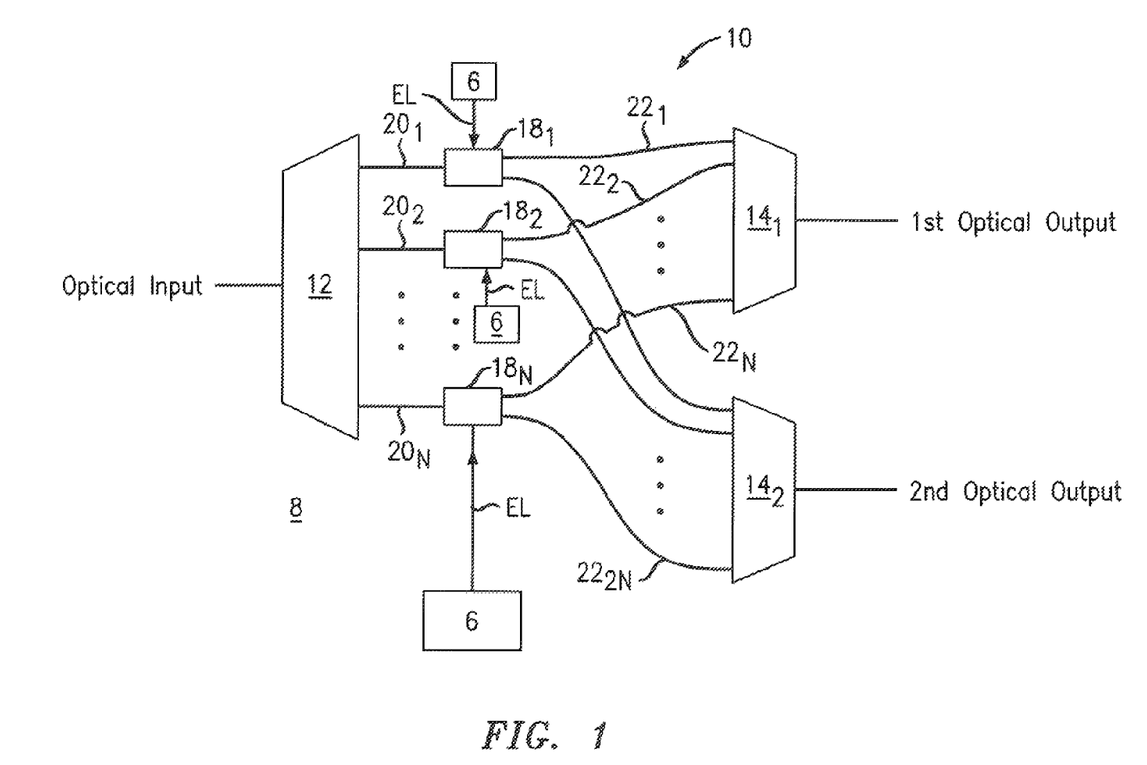
FIG. 1 is a block diagram illustrating an example of a 1×2 optical wavelength selective switch (OWSS), which may be, e.g., an integrated and/or gridless optical device in some embodiments.

FIG. 1 illustrates a 1×2 OWSS 10 that includes an electronic controller 6, a 1×N optical arrayed-waveguide-grating (AWG) demultiplexer 12, first and second N×1 optical AWG multiplexers $14_1$-$14_2$; an array of N 1×2 controllable optical switches $18_1$, $18_2$, ..., $18_N$; a first set of N planar optical waveguides $20_1$, $20_2$, ..., $20_N$, and a second set of 2N planar optical waveguides $22_1$, $22_2$, ..., $22_N$, ..., $22_{2N}$.

Here, N is a positive integer, e.g., 1, 2, 3, etc. The integer N may be, e.g., the number of wavelength channels to be received at and demultiplexed by the optical AWG demultiplexer 12. Alternately, the integer N may be, e.g., a positive integer multiple of said number, e.g., 2, 3, 4, or more times the number of wavelength channels to be received at and demultiplexed by the 1×N optical AWG demultiplexer 12.

In FIG. 1, the optical elements 12, $14_1$-$14_2$; $18_1$-$18_N$; $20_1$-$20_N$, $22_1$-$22_{2N}$ may be integrated along a planar surface of a single substrate, e.g., to form an integrated optical device. In such embodiments, the electronic controller 6 may or may not be integrated along the planar surface to the same substrate.

In FIG. 1, the controller 6 is electrically configured to operate the N 1×2 controllable optical switches $18_1$-$18_N$ and is connected thereto via electrical lines, EL, which are schematically indicated in FIG. 1. Individual ones of or disjoint proper subsets of the 1×2 controllable optical switches $18_1$-$18_N$ may be separately operated by the controller 6 so that individual ones of or disjoint proper subsets of the 1×2 controllable optical switches $18_1$-$18_N$ can route received light separately from the rest of the 1×2 controllable optical switches $18_1$-$18_N$. In some embodiments, the controller 6 may be configured to also operate the 1×2 switches $18_1$-$18_N$ in a manner that controls both the magnitude and/or phase of the light passing there through, i.e., in an analog manner.

In the 1×2 OWSS 10, the 1×N optical AWG demultiplexer 12 outputs a separate about equal-width wavelength-pixel of the received light signal to each of its N optical outputs. For a set of wavelength channels of about equal spacing, the 1×N optical AWG demultiplexer 12 may be configured so that each wavelength channel of the received light has the same number of about equal-width wavelength pixels, e.g., 1, 2, 3, 4, or more wavelength pixels per channel. Each optical output of the 1×N optical AWG demultiplexer 12 is connected to send light of the corresponding wavelength pixel to a corresponding one of the 1×2 controllable optical switches $18_1$-$18_N$ via one of the N optical waveguides $20_1$-$20_N$.

In the 1×2 OWSS 10, each optical input of the first and second N×1 optical AWG multiplexers $14_1$-$14_2$ connect by a corresponding one of the 2N optical waveguides $22_1$-$22_{2N}$ to a corresponding one of the optical outputs of the 1×2 controllable optical switches $18_1$-$18_N$. For that reason, a set of N parallel optical paths connect the 1×N optical demultiplexer 12 to each of the first and second N×1 optical AWG multiplexers $14_1$-$14_2$. For each of the first and second N×1 AWG multiplexers $14_1$-$14_2$, the k-th optical path of the set passes through the k-th one of the 1×2 controllable optical switches $18_1$-$18_N$.

In the 1×2 OWSS 10, each 1×2 controllable optical switch $18_k$ is operable by the controller 6 to transmit light either to the first N×1 optical AWG multiplexer $14_1$, i.e., via the (k)-th optical waveguide $22_k$ or alternatively to the second N×1 optical AWG multiplexer $14_2$, i.e., via the N+k-th optical waveguide $22_{N+k}$. The electronic controller 6 separately operates the 1×2 controllable optical switches $18_1$-$18_N$ to cause such light routing. Thus, light of the individual wavelength pixels and/or wavelength channels may be routed to either the $1^{st}$ optical output of the OWSS 10 or the $2^{nd}$ optical output of the OWSS 10. Thus, in various embodiments of the controller 6 may be configured to operate the 1×2 controllable optical switches $18_1$-$18_N$ to differently or separately route different wavelength channels and/or disjoint sets of adjacent wavelength pixels.

In addition, the electronic controller 6 may be configurable to operate the controllable optical switches $18_1$-$18_N$ to route disjoint sets of wavelength-pixels of different size in the same manner. For example, the controller 6 be configurable to route together disjoint sets of two wavelength-pixels, to route together disjoint sets of four wavelength-pixels, or to route together disjoint sets of four wavelength-pixels. In such embodiments, the ability to change the size of each disjoint set of wavelength-pixels can enable such an OSS to be operated as a gridless optical device.

In some embodiments, individual ones of the 1×2 controllable optical switches $18_1$-$18_N$ may also be operated to cause an overall delay to light transmitted thereby. In some such embodiments, the electronic controller 6 may set the overall time delays caused by various ones of the 1×2 controllable optical switches $18_1$-$18_N$ to compensate for relative fabrication differences in the N parallel optical paths between the optical input of the 1×N optical AWG demultiplexer 12 and the optical output of either of the N×1 optical AWG demultiplexers $14_1$-$14_2$. In particular, the electronic controller 6 may be set such overall time delays so that light, which is combined in the first N×1 optical AWG multiplexer $14_1$ effectively traverses the same optical path length from the optical input of the 1×N optical AWG demultiplexer 12. Similarly, the electronic controller 6 may be set such overall time delays so that light, which is combined in the second N×1 optical AWG multiplexer 14₂ effectively traverses the same optical path length from the optical input of the 1×N optical AWG demultiplexer 12. That is, the controller 6 may set optical path lengths of the N parallel paths between the optical input of the OWSS 10 and either optical output thereof to be about equal. In particular, the electronic controller 6 preferably fixes such optical path lengths such that light of the different wavelength-pixels of the same wavelength channel is interfered in the optical AWG multiplexers 14₁-14₂ with relative phase differences of less than about 10 degrees.

In some embodiments, the individual 1×2 controllable optical switches 18₁-18_N may include variable optical attenuators (VOAs) on optical outputs thereof, or the optical waveguides 22₁-22_{2N} may include such VOAs therealong. The VOAs may be connected to and controlled by the electronic controller 6, i.e., to enable analog control of the amplitude of light transmitted from the 1×2 controllable optical switches 18₁-18_N. The electronic controller 6 may be configured to set the VOAs so that light of the different wavelength channels or light of the different wavelength pixels of one or more individual wavelength-channels has about the same magnitude when interfered in the optical AWG multiplexers 14₁-14₂. In some such embodiments, such analog amplitude control may be used to provide a substantially flat band output to the OWSS 10.

Figure 5:
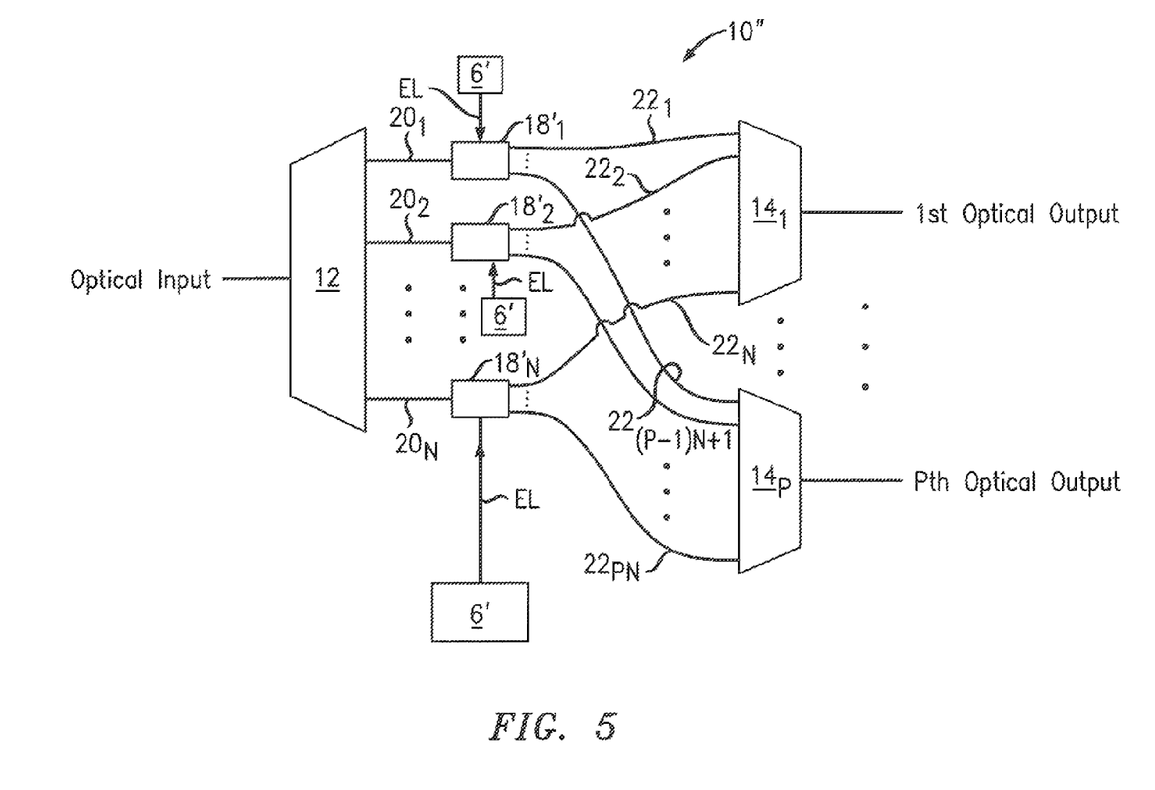
FIG. 5 is a block diagram illustrating an example of a 1×P optical wavelength selective switch (OWSS), which may be, e.g., an integrated and/or gridless optical device in some embodiments.

In various embodiments, the OSSes 10 and 10" of FIGS. 1 and 5 may be configured to process a received sequence of adjacent disjoint wavelength-channels such that each wavelength-channel is carried along a plurality of the substantially separate internal optical paths in the OSS 10, 10". For example, the 1×N optical AWG demultiplexer 12 and N×1 AWG optical multiplexers 14₁-14_P are typically configured such that N is larger than the number of wavelength-channels in the received sequence. Usually, a band of adjacent disjoint wavelength channels of spacing 50 giga-hertz routed to the N optical outputs of the 1×N optical AWG demultiplexer 12, would be routed such that each wavelength-channel is transmitted to 2, 3, 4, 5, 6, 7, 8 or more of said N optical outputs. Similarly, usually, each wavelength-channel would be received by 2, 3, 4, 5, 6, 7, 8 or more of the N optical inputs of the AWG optical multiplexer 14₁-14_P to which the wavelength-channel is routed.

Figure 2:
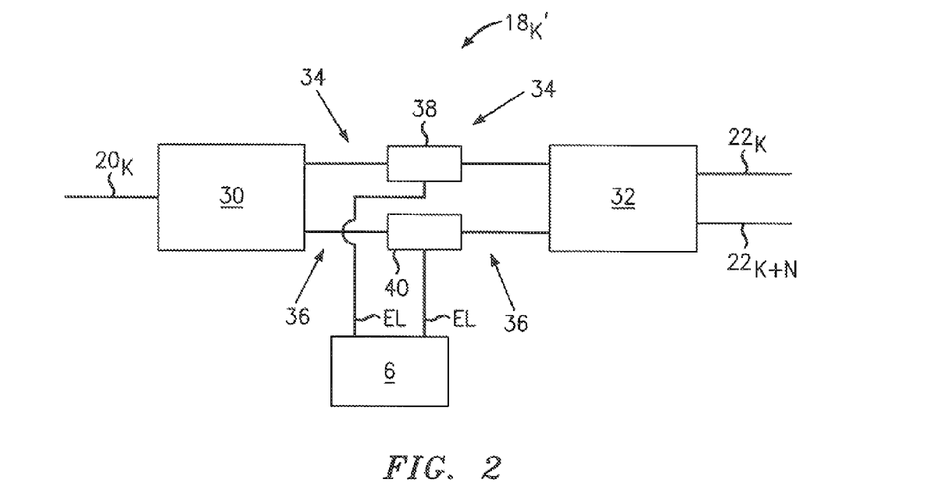
FIG. 2 is a block diagram illustrating an example of a controllable 1×2 optical switch for use in the OWSS of FIG. 1.

FIG. 2 illustrates an example embodiment of the K-th one of the N 1×2 controllable optical switches 18₁-18_N as shown in FIG. 1. Each of the N 1×2 controllable optical switches 18₁-18_N may, e.g., have a structure similar to that of the example embodiment. For the example embodiment, FIG. 2 schematically illustrates optical connections to corresponding ones 20_K, 22_{2K}, 22_{2K+1} of the optical waveguides 20₁-20_N, 22₁-22_{2N} of FIG. 1 and electrical connections, EL to the electronic controller 6 of FIG. 1. That is, these external connections are illustrated for the case where the example embodiment is the K-th one of the N 1×2 optical switches 18₁-18_N of FIG. 1.

Referring to FIG. 2, the example embodiment of the 1×2 controllable optical switch includes a controllable 1×2 Mach-Zehnder interferometer (MZI) switch 18_K'. The controllable 1×2 MZI 18_K' includes two 1×2 optical couplers 30, 32 and two internal optical waveguides 34, 36. Each of the 1×2 optical couplers 30, 32 may be, e.g., a 1×2 multimode interference (MMI) coupler or a 1×2 optical power splitter. Each of the internal optical waveguides 34, 36 has a controllable optical phase shifter 38, 40 thereon. Each controllable optical phase shifter 38, 40 may be a thermo-optically controllable phase shifter or another type of conventional controllable optical phase shifter, e.g., a phase shifter based on a medium with a refractive index whose value depends on the voltage applied thereacross.

In the 1×2 MZI switch 18_K', both controllable optical phase shifters 38, 40 are electrically controlled by the electronic controller 6. In particular, the electronic controller 6 can set the controllable optical phase shifters 38, 40 to produce relative phase shifts to light recombined in the 1×2 optical coupler 32 so that said combined light is routed to a selected one of the optical waveguides 22_{2K-1}-22_{2K} and is not significantly transmitted to the remaining one of the optical waveguides 22_{2K-1}-22_{2K}.

In some embodiments, the electronic controller 6 may also be configured to adjust the average overall optical path length through individual ones of the 1×2 MZI switches 18_K', e.g., to compensate for significant phase differences between light emitted therefrom and light emitted from the N−1 other 1×2 MZI switches 18₁'-18_N' of FIG. 1. For example, differences in optical path lengths of the parallel optical paths between the optical input of the 1×N optical AWG demultiplexer 12 and the optical outputs of the N×1 optical AWG multiplexers 14₁-14₂ may be thereby eliminated or reduced. To reduce or eliminate such optical path length differences, the electronic controller 6 may adjust both of the optical phase shifters 38, 40 of the same MZI switch 18_K' to produce some added phases in the same direction i.e., for both internal arms of the same MZI switch 18_K'.

In some embodiments, the electronic controller 6 may also be configured to adjust the optical phase shifters 38, 40 so that the average amplitude of light emitted from the 1×2 MZI switches 18_K' has an overall modulation with the sequential position of the switch in the array of N such 1×2 controllable optical switches 18₁-18_N. Such an overall amplitude modulation can aid to make the transmission spectrum at the 1$^{st}$ and 2$^{nd}$ optical outputs of the OWSS 10 of FIG. 1 more spectrally flat.

Thus, the electronic controller 6 can be configured to adjust the two controllable optical phase shifters 38, 40 of the 1×2 MZI switch 18_K to adjust both the magnitude and the overall phase of the light output therefrom.

Also, a 1×1 MZI shutter or VOA may be incorporated into one or both the optical outputs of each individual 1×2 MZI switches 18₁'-18_N' to reduce optical crosstalk between the two optical outputs. These 1×1 MZI shutters of VOAs may also be operated as analog VOAs, e.g., by the controller 6, to control the magnitude or both the magnitude and phase of the light passing therethrough in an analog manner.

In some embodiments, the 1×N optical AWG demultiplexer 12 and/or the N×1 optical AWG multiplexers 14₁-14₂ may be configured to adequately sample spectral content of light such that the OWSS 10 has a relatively flat spectral response on its 1$^{st}$ and 2$^{nd}$ optical outputs. For example, the optical AWG multiplexer 12 and the optical AWG demultiplexers 14₁-14₂ may have similar or the same constructions. Also, the optical AWG demultiplexer 12 may be configured to have two or more optical outputs per wavelength channel, i.e., multiple wavelength pixels per wavelength channel, to provide good spectral sampling thereof. Also, the spectral sampling of the 1×N optical AWG demultiplexer 12 and the N×1 optical AWG multiplexers 14₁-14₂ may be configured to reduce or remove aliasing of information carried on different wavelength channels.

In some such embodiments, the optical AWG demultiplexer 12 and/or one or both of the 1×N optical AWG multiplexers 14₁-14₂ may have optical AWG sampling coefficients of about 1.0 or more. Herein, an optical AWG sampling coefficient is defined as $(\lambda \cdot R)/(M \cdot a \cdot b)$, e.g., the conventional AWG sampling coefficient for an AWG-type optical multiplexer or an AWG-type optical demultiplexer as known to persons of skill in the art of integrated optical devices. In this definition, the integer "M" is the number of optical waveguides in the optical AWG of the optical AWG demultiplexer or optical AWG multiplexer, "R" is the length and/or radius of curvature of input and output surfaces of the output and/or input star coupler(s) thereof, "a" is the waveguide pitch of the optical AWG, "b" is the pitch of the N optical inputs or outputs coupled to the optical AWG, and "λ" is the wavelength of the light being optical switched by the AWG-type optical multiplexer or AWG-type optical demultiplexer. Typically, λ is a wavelength of light in the optical telecommunication C-band, L-band, or S-band. Such optical AWG sampling coefficients typically sufficiently sample the optical wavefront on the output surface of the last star coupler of the 1×N optical AWG demultiplexer 12 to enable the parallel set of N optical paths therefrom to about reproduce said optical wavefront at the inputs of the first star couplers of the N×1 optical AWG multiplexers $14_1$-$14_2$. Such detailed optical sampling can help to reconstruct such light wavefronts so that the spectral responses of some embodiments of the 1×2 OWSS 10 are relatively spectrally flat.

Referring again to FIG. 1, the optical elements 12, $14_1$-$14_2$, $18_1$-$18_{2N}$, $20_1$-$20_N$, $22_1$-$22_{2N}$ of the OWSS 10 may be integrated over a surface of a single substrate 8, e.g., a planar surface of the substrate 8. The 1×N optical AWG demultiplexer 12, the N×1 optical AWG multiplexers $14_1$-$14_2$, the planar optical waveguides $20_1$-$20_N$; $22_1$-$22_{2N}$, and/or the 1×2 optical switches $18_1$-$18_N$ may include, e.g., any conventional planar optical structures. In one example, these structures are fabricated over a portion of a silicon chip. In such an embodiment, the passive optical structures 12, $14_1$-$14_2$, $20_1$-$20_N$, and $22_1$-$22_{2N}$ may include about 400-nm-high $Si_3N_4$ (i.e., silicon nitride) optical cores. Such $Si_3N_4$ optical cores may have a large bandwidth, may be easy to fabricate, and may cause only low amounts of back reflection, e.g., for light in the optical telecommunications S, C, or L band. In an optical AWG, $Si_3N_4$ optical cores may, e.g., have lower loss, better optical crosstalk, and less temperature dependence than Si optical cores, e.g., for light in the S, C, or L bands. Examples of bend radii for the various optical AWGs of such optical devices may be, e.g., about 50 micro-meters or less. The 1×2 optical switches $18_1$-$18_N$ may include, e.g., about 220-nm-high silicon optical cores, e.g., located below the $Si_3N_4$ optical core layer of the optical waveguides $20_1$-$20_N$; $22_1$-$22_{2N}$ and may have end-segments thereof coupled thereto, e.g., by conventionally vertically or laterally tapered end-segments of the optical waveguides $20_1$-$20_N$; $22_1$-$22_{2N}$. The optical phase shifters 38, 40 of FIG. 2, e.g., may, e.g., also have $Si_3N_4$ optical cores and may be laterally separated by conventional trenches from surrounding structures and/or vertically partially separated from the Si substrate via conventional undercuts. At inlets and/or outlets between various ones of the optical elements 12, $14_1$-$14_2$, $18_1$-$18_N$, $20_1$-$20_N$, and/or $22_1$-$22_{2N}$, partially etched vertically, laterally, or temporally tapered structures may be included to reduce optical insertion losses.

Figure 3:
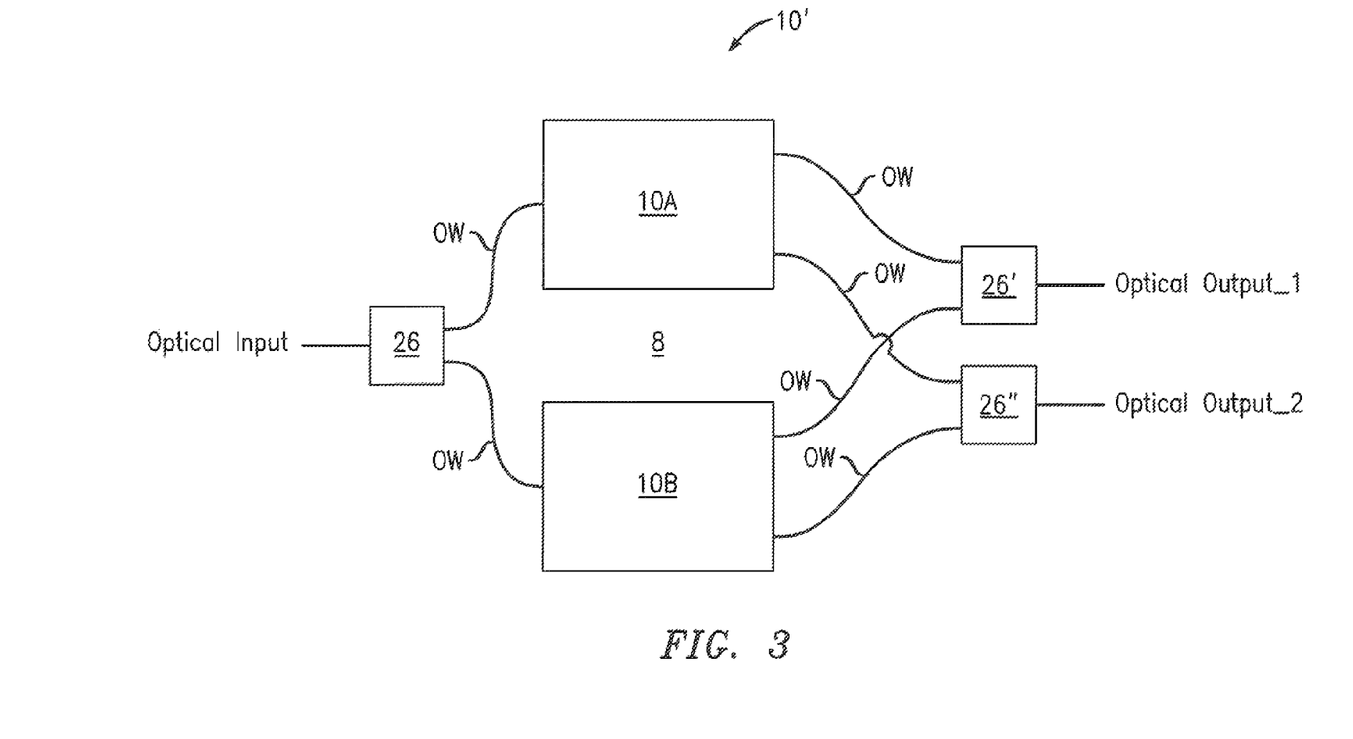
FIG. 3 is a block diagram illustrating a polarization diverse 1×2 OWSS, which may be incorporate two of the OWSSs as illustrated in FIG. 1.

FIG. 3 illustrates an embodiment of an OWSS 10' that is substantially polarization independent. In particular, the OWSS 10' includes first and second OWSSes 10A, 10B, e.g., having the form of the OSS 10 in FIG. 1 and polarization beam splitters (PBSs) 26, 26', 26". The PBS 26 separates orthogonal linear polarizations of light incident at the optical input such that the first and second polarization components thereof, e.g., respective horizontal and vertical linear polarization components with respect to the surface of the substrate 8, are directed via planar optical waveguides OW to the first OWSS 10A and the second OWSS 10B, respectively. The PBSs 26', 26" combine light output via planar optical waveguides OW from the first and second OWSSs 10A, 10B to produce substantially polarization-independent routing by the OWSS 10'. In the OWSS 10', the optical components 10A, 10B, and OW may be polarization maintaining components.

In some examples of the OWSS 10', the PBS 26 may include 2-D optical grating coupler that is integrated into the substrate 8. For such a PBS 26, a light beam can couple thereto by being incident on the shown portion of the broad surface of the substrate 8 wherein the PBS 26 is located. Indeed, for some incidence angles, such a 2-D optical grating coupler can cause both polarization components of the incident light beam to be substantially transmitted to separate transverse-electric (TE) propagation modes in the waveguide structures on the substrate 8. For such a configuration, both polarizations of the incident light beam will cause light to propagate in the waveguide structures of the OWSSs 10A and 10B with similar or the same propagation properties.

Figure 4:
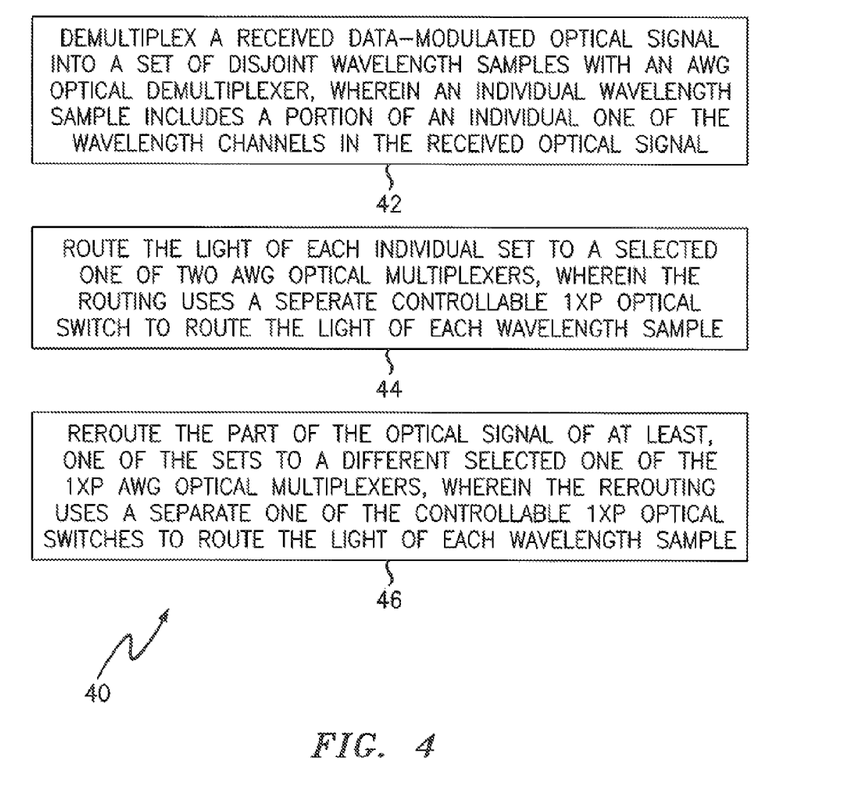
FIG. 4 is a flow chart illustrating a method of using an OWSS, e.g., the OWSSs of FIGS. 1, 3, and 5.

FIG. 4 illustrates a method 40 for operating an OWSS, e.g., embodiments of the OWSSes 10, 10A, 10B, of FIGS. 1 and 3 or an embodiment of OWSS 10" of FIG. 5, which is described below.

The method 40 includes optically demultiplexing a received data-modulated optical signal into a sequence of disjoint wavelength samples with an optical AWG demultiplexer, e.g., the 1×N optical AWG demultiplexer 12 of FIGS. 1 and 5 (step 42). Here, an individual wavelength sample, i.e., a wavelength pixel, includes a portion of or all of an individual one of the wavelength channels in the received data-modulated optical signal. The different wavelength samples at the optical outputs of the optical AWG demultiplexer may have, e.g., about the same spectral width. A set of successive one or more of the wavelength samples, e.g., at a sequence of laterally adjacent optical outputs of a planar version of the AWG optical demultiplexer, include light of an individual one of the wavelength channels of the received data-modulated optical signal. Herein, different wavelength channels of the received data-modulated optical signal may have separate or independent data streams modulated thereon. Indeed, the wavelength-samples form a sequence of disjoint sets of such wavelength-samples, wherein each such set typically includes light of, at most, a single one of the wavelength-channels of the received data-modulated optical signal. Each set also includes the same number M of such samples of different wavelength, e.g., M may be 1, 2, 3, 4, 5, 6, 7, 8 or more, i.e., M is the integer number of wavelength pixels in a set.

The method 40 includes selectively routing the light of each wavelength sample or the set of such samples for a single wavelength channel to a selected one optical AWG multiplexer, i.e., one among a plurality thereof (step 44). For example in the OWSSes 10, 10" of FIGS. 1 and 5, the routing step 44 involves selectively routing the light of individual ones of the wavelength samples or the individual sets of such wavelength samples for single wavelength channels selectively to the N×1 optical AWG multiplexer $14_1$ or alternatively to the N×1 optical AWG multiplexer $14_2$ of FIGS. 1 and 5. There, the selective routing uses a separate controllable 1×P optical switch to route the light of the corresponding one of the wavelength samples. Here, P is an integer greater than or equal to 2. Thus, while the routing involves operating a separate 1×P optical switch, e.g., one of the 1×P optical switches $18_1$-$18_N$ and $18'_1$-$18'_N$ of FIGS. 1 and 5, to route the light of each individual wavelength sample, the light of each of the wavelength samples of an individual wavelength channel are typically routed to the same one of the optical demultiplexers. The routing step 44 routes the light of each wavelength channel to one of the two optical AWG multiplexers, but the destination optical AWG multiplexer may obviously be different for different ones of the wavelength-channels. The optical AWG multiplexers output the light received therein to separate optical outputs, e.g., either the 1$^{st}$ optical output or the 2$^{nd}$ optical output illustrated in FIG. 1.

The method 40 includes rerouting the portion of the optical signal in, at least, one of the wavelength samples or, e.g., at least, in the set of wavelength samples for a single wavelength channel, to a different selected one of the optical AWG multiplexers (step 46). That is, the rerouting step 46 would reroute, e.g., said wavelength sample(s) to a different one of the optical AWG multiplexers $14_1$-$14_P$ in FIGS. 1 and 5 than the routing step 44 to provide for demultiplexing based on the corresponding wavelength channel. The rerouting step 46 uses the separately controllable 1×P optical switches, e.g., one or more of the 1×P controllable optical switches $18_1$-$18_N$ and $18'_1$-$18'_N$ of FIGS. 1 and 5, to reroute the light of each rerouted wavelength sample. Thus, the re-routing involves changing the switching state of a separate 1×P optical switch to reroute the light of the corresponding wavelength sample of the set being re-routed, and the light of each wavelength sample for a single corresponding wavelength-channel is rerouted to the same one of the optical AWG demultiplexers.

In the method 40 and the OWSSes 10, 10' of FIGS. 1 and 5, disjoint sets of optical switches, wherein each such set has one or more controllable 1×P optical switches, e.g., the 1×P controllable optical switches $18_1$-$18_N$ and $18'_1$-$18'_N$, are operated separately, e.g., by the electronic controller 6, 6', to route the light of individual wavelength channels independently. In addition, the size of the disjoint sets can be changed to change the spacing and bandwidth of the wavelength channels. For example, each disjoint set may include 4 sequential separate wavelength samples and a corresponding four successive ones of the 1×P controllable optical switches, e.g., for the k-th set, switches are 4 sequentially located 1×P controllable optical switches $18_{1+4(k-1)}$-$18_{4+4(k-1)}$ or $18'_{1+4(k-1)}$-$18'_{4+4(k-1)}$, for one bandwidth and wavelength-channel spacing. Each such set may only include 2 sequential wavelength-samples and a corresponding two successive controllable 1×P optical switches for a bandwidth and channel spacing that is half as large in wavelength, e.g., for the k-th wavelength sample, the corresponding 1×P optical switches $18_{1+4(k-1)}$-$18_{2+4(k-1)}$ or $18_{1+4(k-1)}$-$18_{4+k(k-1)}$. Thus, the different ways to group successive ones of the controllable 1×P optical switches $18_1$-$18_N$ into disjoint sets of equal size may provide different ways to perform wavelength selective routing via the method 40 and/or to operate the OWSSes 10, 10' of FIGS. 1 and 5, e.g., enabling gridless optical devices.

FIG. 5 illustrates an example of a 1×P OWSS 10" for which P is an integer greater than 2, e.g., P may be 3, 4, 5, 6, 7, 8, or larger. In some embodiments, the 1×P OWSS 10" may also be, e.g., a gridless optical device. In some embodiments, optical components of the 1×P OWSS 10" may also be integrated over the planar surface of a single substrate.

The 1×P OWSS 10" includes an electronic controller 6'; a 1×N optical AWG demultiplexer 12; P N×1 optical AWG multiplexers $14_1$, . . . , $14_P$; N 1×P controllable optical switches $18'_1$, . . . , $18'_N$; a first set of N optical waveguides $20_1$, . . . , $20_N$; and a second set of PN optical waveguides $22_1$, . . . , $22_N$, . . . , $22_{(P-1)N+1}$, . . . , $22_{PN}$. The integer N may have values already described with respect to the 1×2 OWSS 10 of FIG. 1.

In the 1×P OWSS 10", the optical 1×N AWG demultiplexer 12 and the optical waveguides $20_1$-$20_N$ may have forms already described with respect to the 1×2 OWSS 10 of FIG. 1, e.g., planar optical structures. Each optical waveguide $20_1$-$20_N$ connects one of the optical outputs of the 1×N optical AWG demultiplexer 12 to an optical input of a corresponding one of the N 1×P controllable optical switches $18'_1$-$18'_N$.

In the 1×P OWSS 10", each of the P N×1 optical AWG multiplexeres $14_1$-$14_P$ may have a similar form to the N×1 optical AWG multiplexers $14_1$-$14_2$ of FIG. 1.

In the 1×P OWSS 10", each of the N optical 1×P optical switches $18'_1$-$18'_P$ has its k-th optical output connected, i.e., via one of the PN optical waveguides $22_1$, . . . , $22_{PN}$, to a corresponding optical input of the k-th optical N×1 optical AWG multiplexer $14_1$-$14_P$. Each such 1×P optical switch $18'_1$-$18'_P$ may be, e.g., fabricated as a hierarchically interconnected tree of 1×2 controllable optical switches. Such a hierarchal interconnected tree can selectably route received light to one of the P or more optical outputs thereof.

In the 1×P OWSS 10", the electronic controller 6' is connected and configured to operate the N optical 1×P optical switches $18'_1$-$18'_P$ such that each individual 1×P optical switch $18'_1$-$18'_P$ transmits received light to a selectable single one of its P optical outputs at any one time. That is, the operation causes each 1×P optical switch $18'_1$-$18'_P$ to output received light to one of its optical outputs at any time, but the optical routing thereof may selected to be different at a later time.

In addition, the electronic controller 6' may be additionally be operable to provide analog control of the phase and/or analog control of the amplitude of light transmitted by the individual 1×P optical switches $18'_1$-$18'_P$. For example, each optical output of 1×P optical switches $18'_1$-$18'_P$ may include a 1×1 MZI shutter and/or VOA that is controllable by the electronic controller 6' to make analog adjustments to the intensity of light transmitted therefrom. Such analog controls may be used to ensure that light from different ones of the planar optical waveguides $22_2$, . . . , $22_{PN}$ combines in the individual N×1 optical AWG multiplexers $14_1$-$14_P$ with about the same phase and/or amplitude when such light is in a set of wavelength-samples of the same wavelength-channel.

From the disclosure, drawings, and claims, other embodiments of the invention will be apparent to those skilled in the art.

What is claimed is:

1. An apparatus comprising a wavelength-selective optical switch that comprises:
   an optical AWG demultiplexer having N optical outputs;
   a first optical AWG multiplexer having N optical inputs;
   a second optical AWG multiplexer having N optical inputs; and
   a plurality of controllable 1×P optical switches, each of the optical switches being connected to a corresponding one of the optical outputs of the optical AWG demultiplexer and being connected to corresponding ones of the optical inputs of the respective first and second optical AWG multiplexers, the P being greater than or equal to 2; and
   wherein the optical AWG demultiplexer has an optical AWG sampling coefficient of one or more for light with a wavelength in the optical telecommunication C-band, L-band, or S-band.

2. The apparatus of claim 1, further comprising an integrated optical device including the optical demultiplexer, the optical multiplexers and the optical switches.

3. The apparatus of claim 2, further comprising an electronic controller being configured to operate each optical switch to transmit received light selectively to the first optical AWG multiplexer or to the second optical AWG multiplexer.

4. The apparatus of claim 1, further comprising an electronic controller configured to operate optical switches in disjoint sets such that each optical switch of one of the sets transmits light, in parallel, to the same selected one of the optical AWG demultiplexers, each set being formed by M of the 1×P optical switches, the M being an integer greater than or equal to 2.

5. The apparatus of claim 4, further comprising an integrated optical device including the optical AWG demultiplexer, the optical AWG multiplexers and the optical switches.

6. An apparatus comprising:
a first wavelength-selective optical switch that comprises:
a first optical AWG demultiplexer having N optical outputs,
a first optical AWG multiplexer having N optical inputs,
a second optical AWG multiplexer having N optical inputs, and
a first plurality of controllable 1×P optical switches, each of the optical switches being connected to a corresponding one of the optical outputs of the first optical AWG demultiplexer and being connected to corresponding ones of the optical inputs of the respective first and second optical AWG multiplexers, the P being greater than or equal to 2;
a polarization splitter; and
a second wavelength-selective switch comprising:
a second optical AWG demultiplexer having N optical outputs,
a third optical AWG multiplexer having N optical inputs,
a fourth optical AWG multiplexer having N optical inputs, and
a second plurality of controllable 1×P optical switches, each of the optical switches of the second plurality being connected to a corresponding one of the optical outputs of the second optical AWG demultiplexer and being connected to corresponding ones of the optical inputs of the third and fourth optical AWG multiplexers;
wherein the first optical AWG demultiplexer has an optical AWG sampling coefficient of one or more for light with a wavelength in the optical telecommunication C-band, L-band, or S-band; and
wherein the polarization splitter has first and second optical outputs connected to the first and second optical AWG demultiplexers, respectively.

7. The apparatus of claim 6, further comprising a polarization splitter having first and second optical inputs connected to the first and third optical AWG demultiplexers, respectively.

8. The apparatus of claim 6, further comprising an integrated optical device including the optical AWG demultiplexers, the optical AWG multiplexers and the optical switches.

9. The apparatus of claim 6, further comprising an electronic controller being configured to operate each optical switch of the first plurality to transmit received light to the first optical AWG multiplexer or alternately to transmit the received light to the second optical AWG multiplexer and being configured to operate each optical switch of the second plurality to transmit received light to the third optical AWG multiplexer or alternately to the fourth optical AWG multiplexer.

10. The apparatus of claim 1, further comprising an optical fiber network with multiple optical nodes, one of the nodes connected directly to an optical input of the optical AWG demultiplexer and others of the nodes connected directly to the optical outputs of the optical AWG demultiplexers.

11. A method comprising:
demultiplexing a sequence of adjacent wavelength-channels of a data-modulated optical signal into sets of disjoint wavelength samples with an optical AWG demultiplexer, each of the wavelength samples including a portion of one of the wavelength-channels in the optical signal;
routing light of each individual set to a selected one of P optical AWG multiplexers, the routing using a separate controllable 1×P optical switch to route the light of each of the wavelength samples, the P being greater than or equal to 2; and
rerouting a part of the optical signal of, at least, one of the sets to a different selected one of the P optical AWG multiplexers, the rerouting using one of the controllable 1×P optical switches to reroute light of each wavelength sample of the part of the optical signal to the different selected one of the P optical AWG multiplexers,
wherein the optical AWG demultiplexer has an optical AWG sampling coefficient of one or more for light with a wavelength in the optical telecommunication C-band, L-band, or S-band.

12. The method of claim 11, wherein the optical AWG demultiplexer has an optical AWG sampling coefficient of one or more for light with a wavelength in the optical telecommunication C-band.

13. The method of claim 11, wherein each set includes multiple disjoint ones of the wavelength samples.

* * * * *